Oct. 27, 1953     P. W. PHILLIPSON     2,656,639
REEL SEAT
Filed Nov. 18, 1950

Inventor
PHILIP W. PHILLIPSON

By
Attorney

Patented Oct. 27, 1953

2,656,639

UNITED STATES PATENT OFFICE 2,656,639

REEL SEAT

Philip W. Phillipson, Denver, Colo.

Application November 18, 1950, Serial No. 196,438

1 Claim. (Cl. 43—22)

This invention relates to reel seats of the type commonly employed on and adjacent the handle portion of a fishing rod to mount and secure conventional reels in operative association with the rod, and has as an object to provide an improved form and construction of a generally tubular reel seat particularly adapting such seat for coaction with reel bases of varying size and particular conformation.

A further object of the invention is to provide an improved reel seat for fishing rods characterized by novel means coactable with the bases of conventional reels to inhibit play or insecurity of the reel laterally of the rod.

A further object of the invention is to provide a generally tubular reel seat member mountable on a fishing rod either behind or in advance of the rod handle portion and characterized by an exterior surface area of novel conformation coactable with and to securely mount reel bases of varying size and lateral curvature.

A further object of the invention is to provide an improved reel seat for fishing rods that is simple and inexpensive to manufacture, readily adaptable to use in the usual conventional association with fishing rod elements, that is susceptible of effective cooperation with the customary reel base clamping means, and that assures mounted security and stability of the reel engaged therewith.

With the foregoing and other objects in view, my invention consists in the construction, arrangement, and combination of elements hereinafter set forth, pointed out in my claims, and illustrated by the accompanying drawings, in which—

Figure 1:
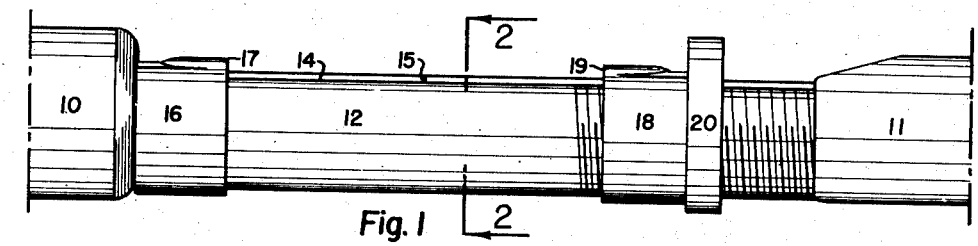
Figure 2:
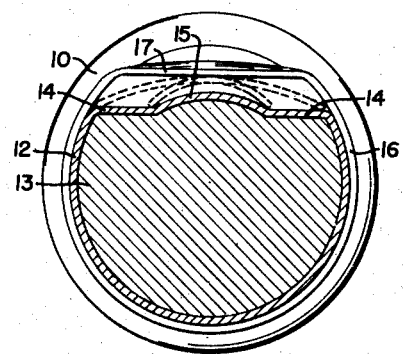
Figure 3:
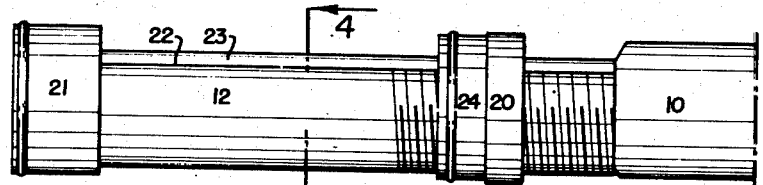
Figure 4:
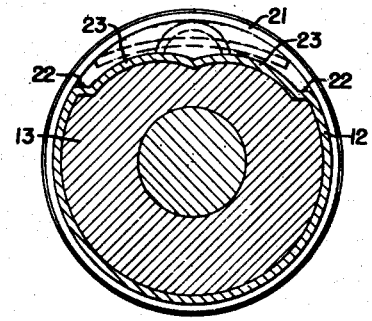

Figure 1 is a side elevation of a typical embodiment of the invention as associated for practical use with and in advance of the handle portion of a fishing rod. Figure 2 is a cross section, on a relatively enlarged scale, taken substantially on the indicated line 2—2 of Figure 1. Figure 3 is an elevation similar to Figure 1 of a modified embodiment of the invention as associated with and behind the handle portion of a fishing rod. Figure 4 is a cross section, on a relatitvely enlarged scale, taken substantially on the indicated line 4—4 of Figure 3.

It is wide spread conventional practice to furnish fishing rods with a straight, tubular member fixed either behind or in advance of the rod handle portion and to condition such elements for the reception and clamped support of conventional reel bases. The various clips, collars, thimbles, and latches conventionally employed in association with tubular reel seats are normally adequate to engage and secure reel bases of various lengths and widths in an operatively satisfactory manner, but the reel seat surface area coactable with the reel bases is customarily either flat or curved to a single arc usually concentric with the seat element in a manner and to a form precluding cooperation with reel bases of varying lateral curvature in a manner to obviate play of the reel laterally of the rod, and it is to the correction of the disadvantage of conventional tubular reel seats just above mentioned that the instant invention is directed.

In the construction of the improvement illustrated by Figures 1 and 2, numeral 10 designates the forward end portion of a conventional fishing rod handle or grip, of any appropriate construction, the numeral 11 designates the rearward end portion of a fishing rod assembly butt section, and the numeral 12 designates generally one embodiment of the improved reel seat as end-fixed to and in bridging relation between spacedly-adjacent ends of the handle 10 and butt section 11. The member 12 is a straight, generally tubular element of appropriate length and any desired suitable material and particular manner of production, and said member is fixed at its ends to and in longitudinal alignment between the elements 10 and 11 in any manner and by any means effective to complete the desired ultimate assembly, a filter unit 13 interiorly traversing the member 12 form and in end engagement with the elements 10 and 11 being indicated as one practical means for accomplishing the desired assembly.

Giving effect to the concept and principles of the invention, one side of the member 12 is worked throughout the member length to present a reel-base-engaging seat of novel form and practical advantage. As is clearly shown in Figure 2, the novel reel base seat is constituted, as by rolling or pressing an originally cylindrical tube, to present straight, flat, spacedly-parallel strip areas 14 longitudinally of the member 12 in a coplanar relation chordally of the original member 12 circular outline, and a transversely-arcuate, outwardly-bowed, longitudinally-straight strip 15 between and merging into the spaced inner margins of the strips 14; the said strips 14 and 15 being integral with the circular wall portions of the member 12 and lying within the completed circular outline of said member. The combined widths of the strips 14 and 15 chordally of the member 12 equals or exceeds the transverse dimension of conventional reel bases adapted for association with the rod assembly including said member, and the width of the strip 15 is preferably less than one-half the combined strip width, whereby to expose relatively wide strip flat surface areas 14 on either side of the arcuate strip 15, and the radius of curvature of strip 15 is relatively great, perhaps approximating the radius of the member 12 circular outline, to limit maximum projection of the strip 15 arch outwardly beyond the plane of the strip 14 surfaces. As is indicated by broken lines in Figure 2, the seat defined by the exterior strip 14 and surfaces 15 is of practical advantage in that the bases of conventional reels, commonly transversely arced to arcs of varying radii, may be securely associated with the improved seat since said reel bases, regardless of their particular width or radius of transverse curvature, will engage at and along each of their side margins with the strip 14 flat surfaces and bridge over the crowned strip 15 without any tendency to rock laterally on the latter; the strip 15 functioning as a longitudinal rib and as means limiting displacement of the reel base laterally of its seat during the operations incident to mounting of the reel.

Completing the improved reel seat for mounting association with conventional reels, a sleeve 16 is fixed in surrounding relation with the rearward end of the member 12 and is formed with a flattened offset 17 spacedly overhanging the rearward ends of the strips 14 and 15 to cooperate with the latter as a socket receptive of the rearward end of a reel base engaged with the improved seat, and a similar sleeve 18 formed with a complementary socket-forming offset 19 loosely and slidably embraces the forward end of the member 12 with its socket opening toward that of the sleeve 16, so that rotation of a collar 20 about and threadedly engaging with the forward end of the member 12 in side-bearing relation with an end of the sleeve 18 may function to shift said sleeve 18 toward the sleeve 16 and to hold the shiftable sleeve in engagement of its socket with and over the forward end of a reel base mounted on the improved seat; such reel-clamping means being old and well known in a variety of constructions equivalent to that shown and described.

The modified construction according to Figures 3 and 4 is functionally the same as that hereinabove described in that it provides a reel seat wherewith the side margins of conventional transversely curved reel bases may engage in a reel mounting inhibitive of lateral reel rocking, and differs from the embodiment first described only in variation of structural detail. In the showing of Figure 3, the modified reel seat is located rearwardly of the conventional rod handle 10 and carries a cylindrical sleeve 21, operatively equivalent to the sleeve 16, as an end cap terminating and closing the reel seat assembly. In the modified construction, the originally cylindrical tube 12 is longitudinally worked to provide straight, flat, spacedly-parallel, relatively narrow shoulder strips 22 in a chordally coplanar disposition and arrangement the same as that of the strips 14 save for the much lesser dimension of the shoulder strips 22 transversely of the member 12. Instead of the single transversely-arched strip 15 of the first disclosure, the width between inner margins of the shoulder strips 22 of the modified construction is closed by a pair of similar, conjoined, transversely-arcuate strips 23, each similar to the strip 15, in an outwardly-bowed arrangement definitive of a line of junction longitudinally and centrally of the reel seat in a plane outwardly from the member 12 circular center beyond the plane common to the strip shoulders 22. Constituted as described and clearly shown in Figure 4, the strips 23 define laterally-spaced straight ribs longitudinally of the reel seat between the shoulder strips 22 and in a doubly-domed extension outwardly beyond the plane of said shoulders, so that reel bases receivable between the shoulders 22 in any given width or transverse curvature will necessarily engage with their spaced side margins against and bridge between lines or zones of the complementary strips 23, as is clearly indicated by broken lines in Figure 4. Since the reel seat of the modified construction more closely approaches the completed circular outline of the member 12, the sleeve 21 may be circular in outline, as shown, without occasion for any socket-forming offset, and the inner end of the reel seat may be threaded, as previously shown and described, for cooperation with a threaded collar 20 in side-bearing relation with the end of a shiftable sleeve 24 formed similarly to the sleeve 18 and operatively complementary to the sleeve 21 in perfecting a reel mounting on the seat of modified construction.

While the views of the drawing indicate one embodiment of the improvement in position for mounting of a reel forwardly of the fishing rod handle and the other embodiment of the improvement disposed for mounting of a reel rearwardly of said handle, it is to be understood that either of the particular embodiments shown may be utilized in any desired position, either forwardly or rearwardly, relative to the rod handle, and that the parttincular reel attaching and securing means associated with the seats shown and described may be interchanged or varied as may be desired, all without in any way affecting the novelty and operatitve advantage of the improvement.

Since changes, variations, and modifications in the particular form, construction, and arrangement of the elements shown and described may be had without departing from the spirit of my invention, I wish to be understood as being limited solely by the scope of the appended claim, rather than by any details of the illustrative showing and foregoing description.

I claim as my invention:

In a reel seat of generally tubular character having spacedly-paired, similar strip areas of uniform width transversely disposed in a common chordal plane as shoulders engageable by outer edge margins of certain conventional, transversely-arcuate reel bases, and a transversely-arcuate, outwardly-bowed strip element integrally bridging between the inner margins of said areas in a width exceeding the combined area widths, means conditioning such seat for engagement of its strip element with the edge margins of reel bases of various widths and arcs of transverse curvature, whereby to obviate rocking of the reel base laterally of its seat, said means comprising a fluting longitudinally and centrally interrupting the outward bow of said strip element to constitute the latter as a pair of parallel, juxtaposed, like, convex ribs similarly projecting outwardly beyond the strip area plane within the transverse circular outline of the assembly.

PHILIP W. PHILLIPSON.

References Cited in the file of this patent

UNITED STATES PATENTS

| Number | Name | Date |
| --- | --- | --- |
| 1,883,041 | Somers | Oct. 18, 1932 |
| 2,076,629 | Edwards | Apr. 13, 1937 |

FOREIGN PATENTS

| Number | Country | Date |
| --- | --- | --- |
| 252,488 | Sweden | of 1948 |